United States Patent [19]

Hall

[11] 4,186,219
[45] Jan. 29, 1980

[54] MAINTAINING THE EFFECTIVENESS OF A COATING COMPOSITION

[75] Inventor: Wilbur S. Hall, Plymouth Meeting, Pa.

[73] Assignee: Union Carbide Corporation, New York, N.Y.

[21] Appl. No.: 824,804

[22] Filed: Aug. 15, 1977

Related U.S. Application Data

[63] Continuation of Ser. No. 609,016, Aug. 29, 1975, abandoned.

[51] Int. Cl.$^2$ .......................... B05D 1/18; B05D 7/14
[52] U.S. Cl. ...................................... 427/8; 427/345; 427/435
[58] Field of Search ............... 427/435, 437, 309, 345, 427/8

[56] References Cited

U.S. PATENT DOCUMENTS

| | | | |
|---|---|---|---|
| 2,132,883 | 10/1938 | Romig | 148/6.15 Z |
| 3,791,431 | 2/1974 | Steinbrecher et al. | 427/435 X |
| 3,934,054 | 1/1976 | Schmeling et al. | 427/8 |

FOREIGN PATENT DOCUMENTS 1356215 6/1974 United Kingdom ..................... 427/435

OTHER PUBLICATIONS

Sienko et al. *Chemistry*, p. 433 (1961).

*Primary Examiner*—Morris Kaplan
*Attorney, Agent, or Firm*—Dale Lynn Carlson

[57] ABSTRACT

In a process wherein a resinous coating is formed on a ferriferous surface by immersing the surface in an acidic aqueous coating composition prepared from dispersed particles of resin, HF and $FeF_3$, wherein said composition forms on said surface a resinous coating which increases in thickness the longer the surface is immersed in the composition and wherein as the composition is used to coat additional surfaces, it begins to form thinner coatings or it destabilizes, the improvement comprising maintaining the effectiveness of said composition by adding thereto an oxidizing agent which is effective in oxidizing ferrous iron.

30 Claims, No Drawings

MAINTAINING THE EFFECTIVENESS OF A COATING COMPOSITION

CROSS-REFERENCE TO RELATED APPLICATION

This is a continuation of application Ser. No. 609,016, filed Aug. 29, 1975, now abandoned.

FIELD OF THE INVENTION

This invention relates to the formation of organic coatings on metallic surfaces. More specifically, this invention relates to the deposition on metallic surfaces of organic coatings by contacting the metallic surfaces with an acidic aqueous coating solution containing dispersed particles of an organic coating-forming material such as resin particles.

A relatively recent development in the coating field is the provision of water-based coating compositions which are effective, without the aid of electricity, in forming on metallic surfaces immersed therein organic coatings that increase in thickness or weight the longer the time the surfaces are immersed in the compositions. (For convenience, a coating formed from such a composition is hereafter referred to as "an organic coating which grows with time" or as an "autodeposited coating".) Speaking generally, compositions which are so effective comprise acidic aqueous coating solutions having dispersed therein particles of an organic material such as resin particles. Autodeposited coatings are formed from such compositions as a result of their ability to attack and dissolve from the metallic surface metal ions in amounts which cause the particles to deposit on the surface in a manner such that there is a continuous buildup of organic coating on the surface.

Coatings formed from such compositions are distinctly different from coatings by immersing the metallic surfaces in conventional latices, it is, compositions comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from the aforementioned recently developed coating compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of the recently developed coating compositions which produce coatings which grow with time offer a number of advantages. For example, other factors held constant, they can be used to apply thicker organic coatings to the metallic surface in a shorter period of time and in a one-step operation. Also, the coating thickness can be controlled by varying the immersion time of the metallic surface in the coating composition. In general, coatings which have improved corrosion resistant properties and aesthetic appearance are obtainable. These are but a few of the advantages which flow from the use of said compositions.

One type of composition which is capable of forming autodeposited coatings includes dispersed resin solids, a soluble ferric-containing (for example, ferric fluoride) and acid (for example, HF) and has a pH within the range of about 1.6 to about 5. Such a composition is the subject of South African Pat. No. 72/1146. It has been found that as the composition is used continuously to coat metallic surfaces immersed therein, coatings formed from the composition tend to become thinner, the longer the use. Continued use of the composition can result in the destabilization of the composition as manifested by the tendency of the dispersed solid particles to flocculate, coagulate or gel throughout the composition. This happens notwithstanding that ingredients comprising the composition are replenished, as needed, during use.

The present invention is directed to maintaining the effectiveness of a composition of the type which forms autodeposited coatings on a metallic surface as the composition is used to coat quantities of metal.

REPORTED DEVELOPMENTS

U.S. Pat. No. 3,791,431, to Steinbrecher and Hall, assigned to the same assignee as the present invention, discloses that coating compositions capable of forming on metallic surfaces immersed therein autodeposited coatings tend to destabilize as a result of the buildup of metal ions in the composition as it is used continuously. The patent further discloses that the stability of the composition can be maintained by inhibiting or deterring the buildup in the composition of the excessive amounts of metal ions which cause it to become unstable. Exemplary methods for accomplishing this are disclosed to be removing the excessive amounts of metal ions from the composition or converting them to an innocuous form, that is, a form in which they are ineffective for destabilizing the composition. An example of the former method is disclosed to be the use of a precipitating agent to precipitate the metal ions. (See also U.S. Pat. No. 3,839,097 which discloses the use of an ion exchange material to remove metal ions from the composition.) An example of the latter method is disclosed to be including in the composition a chelating agent which complexes the metal ions.

In U.S. patent application Ser. No. 365,699, filed May 31, 1973, now Pat. No. 3,936,546, in the name of the applicant herein, and assigned to the same assignee as the present invention, it is disclosed that the effectiveness of a coating composition which tends to become inoperative as a result of the buildup of metal ions can be prolonged by adding dispersing agent thereto in an amount over and above that which would be conventionally added when replenishing the ingredients of the composition as they are depleted during use.

U.S. Pat. No. 3,709,743 discloses that metal ion buildup in the composition has a destabilizing effect thereon and causes coagulation of the composition when the buildup becomes sufficiently high. The patent discloses further that the metal ion buildup can be controlled by the use of methods such as electrodeposition, precipitation, ion exchange, and ultrafiltration.

The present invention is directed to a method for maintaining the effectiveness of a coating composition which is capable of forming autodeposited coatings as it is continuously used, which method has certain advantages over other methods such as those described above.

SUMMARY OF THE INVENTION

In accordance with this invention, the effectiveness of a coating composition of the type which forms autodeposited coatings on a metallic surface immersed therein is maintained as the composition is used by adding to the composition a material which is effective in oxidizing metal ions which tend to buildup in the composition and adversely affect the coating capabilities of the composition or cause it to destabilize.

DETAILED DESCRIPTION OF THE INVENTION

The invention will be described in connection with the use of an acidic aqueous coating composition of the type which is prepared from solid resin particles, $FeF_3$, HF and optionally pigment. (For example, see aforementioned South African Pat. No. 72/1146.) It should be appreciated that principles underlying the use of the present invention have applicability to other types of compositions which are capable of forming autodeposited coatings.

The aforementioned composition comprises about 5 to about 550 g/l of resin solids, ferric fluoride in an amount equivalent to about 0.025 to about 3.5 g/l ferric iron, preferably about 0.3 to about 1.6 g/l of ferric iron, and HF in an amount sufficient to impart to the composition a pH within the range of about 1.6 to about 5.0. Suitable pigments can be included in the composition. Examples of pigments that can be used are carbon black, phthalocyanine blue, phthalocyanine green, quinacridone red, Hansa yellow, and benzidine yellow. The pigment should be added to the composition in an amount which imparts to the coating the desired color and/or the desired depth or degree of hue. It should be understood that the specific amount used will be governed by the specific pigment used and the color of coating desired.

A preferred composition for use in the practice of the present invention is described in U.S. patent application Ser. No. 562,898, filed Mar. 27, 1975, now abandoned, in the name of Wilbur S. Hall, the applicant herein, assigned to the same assignee as the present invention, and incorporated by reference. The preferred composition has a pH of about 1.6 to about 4 and is prepared from water, ferric fluoride in an amont such that it contains the equivalent of about 0.5 to about 3.5 g/l of ferric iron, about 0.2 to about 5 g/l of HF, optionally, a pigment, for example, carbon black, and about 50 to about 100 g/l of resin particles which are all of substantially the same size and substantially chemically homogeneous, that is, each particle is comprised of the same monomeric constituents present in substantially the same proportions or resin particles which are prepared by copolymerizing the following monomers:

(1) about 25 to about 70, and preferably about 40 to about 65 wt. % of a conjugated diene having, for example, 4 to about 9 carbon atoms, such as butadiene or isoprene;

(2) about 5 to about 70, and preferably about 30 to about 65 wt. % of $CH_2=CHR$, wherein R is an aryl or a cyano group, for example, styrene or acrylonitrile;

(3) about 1 to about 50, and preferably about 3 to about 15 wt. % of a vinyl halide such as vinyl chloride or vinylidene chloride; and (4) about 0.5 to about 15, and preferably about 1 to about 4 wt. % of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid. The resin is used most conveniently in the form of a latex which can be prepared according to available techniques.

A particularly preferred latex contains particles of resin prepared from the aforementioned monomers, which particles are chemically and physically homogeneous. As to the chemical homogeneity of the particles, the ratio of the constituent monomers is substantially the same from particle to particle. As to physical homogeneity, the sizes of the particles are relatively uniform. For example, with latices having an average particle size in the range of about 1,000 to about 3,500 A, the deviation in particle size from the average is a maximum of about ±200 A. Latices having such characteristics are described, for example, In U.S. Pat. Nos. 3,397,165 and 3,472,808. The resin particles of the preferred latex are prepared from styrene, butadiene, vinylidene chloride and methacrylic acid. In addition, the emulsifier content of the preferred latex is about 1 to about 4% based on the resin solids and comprises at least 90 wt. %, most preferably 100 wt. % of an anionic emulsifier such as a sulfonate, for example, sodium dodecylbenzene sulfonate, or a sulfosuccinate, for example, sodium oleoyl isopropanolamide sulfosuccinate, or a mixture thereof.

In forming pigmented black coatings, excellent results have been achieved by using a composition wherein the resin particles are dispersed by an anionic emulsifier, for example, a sulfonate, and wherein the black pigment is added to the composition in the form of an aqueous dispersion of a black pigment dispersed by a nonionic emulsifier, for example, an ethoxylated alkyl phenol. Excellent results have been achieved by using an aqueous dispersion in an amount such that the composition contains about 0.2 to about 3 g of furnace black/100 g of resin solids.

Although the coating composition can be contacted with the metallic surface in a variety of ways, it is believed that the most widely used method of contact will comprise immersing the metallic surface in the coating composition at room temperature. As mentioned above, the longer the metallic surface is immersed in the coating composition, the greater the buildup in coating thickness. It is believed that for most applications, desired coating thicknesses can be obtained by immersing the metallic surface in the composition for a period of time within the range of about 30 seconds to about 3 minutes. However, it should be understood that longer or shorter periods of time can be used.

Agitating the composition aids in maintaining it uniform. Also, agitation of the composition is effective in improving the uniformity of the coatings formed.

As mentioned above, as the composition is used to coat quantities of metal, for example, ferriferous surfaces, it tends to form thinner coatings and can eventually destabilize. This occurs notwithstanding that ingredients comprising the composition are replenished, as needed, during use.

With regard to replenishment, the solids, including resin and pigment (if present) are depleted during use as they deposit in the form of coatings on the metallic surfaces. In general, the rate of coating formation is directly related to the solids concentration. The higher the concentration of solids, the heavier or thicker the coating formed, other factors held constant. In some industrial operations, it is believed that the amount of solids removed from the composition as quantities of metal are coated will be small, relative to the total solids in the composition. In such an operation, the solids content may vary over a wide range without significantly reducing the thicknesses of the coatings formed. It is further noted that pigment and resin particles may be consumed in the same proportion as existed in a freshly formulated composition. In such applications, these solids can be replenished in the form of a mixture in which the desired ratio of pigment to resin is present. The solids can be added to the composition periodically as needed or they can be added continuously at a rate which will approximate the rate of depletion. The solids content of the composition can be determined readily by various methods. For example, a known volume of the used aqueous coating composition can be pipetted into a container of known weight and the water evaporated at elevated temperature. The amount of solids in the sample can then be determined by weighing and this compared to the amount desired in the composition. An appropriate amount of solids can then be added to the composition for replenishing.

With regard to the HP ingredient, it is believed that at least a portion of the HF dissociates to hydrogen ion and fluoride ion. The hydrogen ion attacks and dissolves metal from the surface of the article being coated and in the process is reduced to hydrogen. As this occurs, additional quantities of the HF are dissociated with the result that this ingredient is depleted. Other factors held constant, it has been found that as HF is depleted, the composition tends to form uneven coatings of reduced thickness and coatings which have a tendency to slough. Accordingly, this ingredient should be replenished during use of the composition. The effective amount of HF can be monitored by the use of available apparatus which directly or indirectly measures HF concentration. An example of such an apparatus is described in U.S. Pat. No. 3,329,587 and is sold under the trademark "Lineguard" Meter 101. By determining the effective concentration range of HF in a satisfactorily working composition, amounts of HF can be added to the composition to keep its concentration in the effective range, being guided by monitoring apparatus used to track the HF concentration. In general, replenishing the HF as needed will maintain the pH of the composition in the desired range.

With respect to the $FeF_3$, it is believed that this ingredient in some way, not fully understood, either directly or indirectly aids in the dissolution of the metallic surface or directly is involved in the dissolution reaction. Accordingly, this ingredient or source thereof is needed in the composition and if depleted, should be replenished. It has been observed that there are operations where the ferric fluoride concentration appears to remain substantially constant during relatively long periods of continued use of the composition. It is believed that this is attributable to the formation of ferric iron in situ. By way of explanation, it is believed that ferrous iron is formed in the composition from the dissolution of a ferriferous surface. It is believed that at least some of the ferrous iron is oxidized to the ferric form, for example, by oxygen in air which is in contact with the surface of the composition. Thus, ferric iron is formed in situ. As mentioned above, fluoride is generated in the composition as a result of dissociation of the HF and is available to combine with the ferric iron to form ferric fluoride, which, as mentioned above, is soluble in the composition. Although formed in situ, it is noted that the ferric iron concentration will be depleted as a result of drag out.

It should be noted further that although ferric fluoride is added to the composition, it may exist therein in various forms such as various complex fluorides and free ferric and fluoride ion. Similarly, ferrous iron which is generated may exist in various forms of complex fluorides and as free ferrous ion.

Thus, as the coating composition is used to coat quantities of metallic surfaces immersed therein, and as the ingredients thereof are replenished, as needed and, for example, as described above, quantities of ferrous iron are released into the composition as a result of the chemical action of the composition on the metallic surface. As this occurs, the composition tends to form thinner coatings, and, if continuously used, the resin solids begin to collect into larger particles, which may appear as grit-like particles on the coated surface. With continued use, the resin dispersion can break. As mentioned above, some of the ferrous iron may be oxidized to ferric iron. However, in an actively used composition, it appears that the amount of ferrous iron released into the composition is so great that air oxidation is not sufficient to deter the buildup of excess quantities of ferrous iron which have an adverse effect on the coating operation. (While the ferrous iron, in whatever form present, has an adverse effect on the composition, ferric iron in whatever form present, does not.) It is believed that excess quantities of ferrous iron cause the dispersed particles to coagulate throughout significant portions or the whole of the composition. It is believed also that the ferrous iron significantly reduces the role the ferric iron plays in the formation of the coating. This is believed to account for the tendency of the composition to form thinner coatings as it is used and as the ferrous iron builds up in the concentration.

The above problems can be alleviated or avoided by adding to the composition, as needed, a material which oxidizes ferrous iron to ferric iron.

In view of the numerous variables which are inherent in the coating process, it is impractical, if not impossible, to state a numerical value at which the excess ferrous iron tends to create problems. The following factors each move a bearing: the type of metal being coated; the specific type of organic coating-forming material comprising the composition; the types and amounts of dispersing agents in the composition; the rate of throughput of metallic surfaces in the composition; the extent to which the composition dissolves the metallic surface; the age of the composition; and the extent to which ferrous iron tends to be air-oxidized. For this reason, it has been found more expedient to make certain empirical determinations respecting the operating characteristics of specific processes, and then utilize these determinations as guidelines for adjusting or controlling the amount of excess ferrous iron which causes problems. Information gathered from these empirical determinations can be used to determine when ferrous iron begins to buildup in an excessive amount and how much oxidizing agent should be added to the composition.

One exemplary way of monitoring the buildup of excessive amounts of ferrous iron is by measuring the redox potential of the composition. It is noted that in the aforedescribed composition one oxidation/reduction couple is present. Any suitable instrument which is capable of measuring a difference in potential in millivolts can be used. For example, a potentiometer having a calomel cell, or other suitable reference cell, and a platinum electrode can be used. The electrodes are contacted with the composition and the electrical potential between the two electrodes is measured. In the use of such an apparatus it has been observed that as the composition is used and ferrous iron builds up, the millivolt reading of the instrument tends to fall. Accordingly, for any particular application, the millivolt reading can be related to the point at which coatings of unsuitable thickness are formed. In effect, the millivolt reading range of a satisfactorily operating composition can be determined and steps taken to maintain the millivolt reading within the desired range by adding to the composition an oxidizing agent for the ferrous iron. As the oxidizing agent is added, the millivolt reading rises.

Any oxidizing agent which does not substantially adversely affect the coating operation can be used. The use of hydrogen peroxide is particularly preferred. It rapidly performs its oxidizing function and forms water, a constituent of the composition. The amount of oxidizing agent to add will, of course, depend on the amount of ferrous iron that should be oxidized. This can be determined readily for any specific coating operation. Depending on the specific application involved, the oxidizing agent can be added periodically or continuously.

After contact with the coating composition, the coated metallic surface can be subjected to further processing steps as are known. Such steps are described briefly hereafter.

Water rinsing the coated surface after it has been withdrawn from the composition, and before significant drying takes place, is effective in removing therefrom residuals such as acid and other ingredients of the bath that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be avoided.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. It has been reported also that the water and salt spray resistance of a fused resinous coating can be improved by contacting the unfused coating with a solution, preferably an aqueous solution, of phosphoric acid (see U.S. Pat. No. 3,647,567). The recommended amount of phsophoric acid in the solution is about 0.25 to about 7 wt. % based on the total weight of the solution.

Following any rinse steps employed after the coated surface is withdrawn from the composition, the coating should be dried. Fusion of the resinous coating renders it continuous, thereby improving its resistance to corrosion and adherence to the underlying metallic surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100° to about 200° C. for periods of time within the range of about 10 to about 30 minutes, depending on the mass of the coated part. Baking the coating for a period of time until the metallic surface has reached the temperature of the heated environment has been used effectively.

EXAMPLES

Examples below are illustrative of the practice of the present invention.

The basic coating compositions used in all of the examples were prepared by combining.

| Ingredients | Amounts |
| --- | --- |
| latex containing about 54% solids | 190 g |
| ferric fluoride | 3 g |
| hydrofluoric acid | 2.3 g |
| black pigment dispersion | 5 g |
| water | to make 1 liter. |

The resin of the latex used in the above composition comprised about 62% styrene, about 30% butadiene, about 5% vinylidene chloride and about 3% methacrylic acid. A film formed from the resin is soluble in refluxing chlorobenzene to the extent of about 13%. That the resin is crosslinked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex was about 7.8 and the surface tension thereof about 45–50 dynes/cm. The average particle size of the resin was about 2,000 A.

The black pigment dispersion used in the above composition is an aqueous dispersion having a total solids content of about 36%. Carbon black comprises about 30% of the dispersion. It has a pH of about 10–11.5 and a specific gravity of about 1.17. The dispersion contains a nonionic dispersing agent for the solids, and is sold under the trademark Aquablak 115.

The metallic surfaces coated in the composition were unpolished cold rolled steel panels (Q-panels) 3"×4". All metallic surfaces were cleaned with a conventional alkali cleaner and rinsed with water prior to being coated.

A potentiometer having a calomel cell and a platinum electrode was used to monitor the buildup of ferrous iron in the above composition as it was used to coat panels. The mv reading for the freshly prepared composition was about 350. The panels were immersed in the composition for about 90 seconds one after another. The following table shows the thicknesses of coatings formed on the panels at various mv readings:

| mv reading | coating thickness in mils |
|---|---|
| 219 | 1.25–1.4 |
| 107 | 1.0 |
| 64 | 0.75–0.8 |

As can be seen from the above table, as the redox potential of the composition decreased (evidencing a buildup in the composition of ferrous iron), the used composition formed thinner coatings.

In another series of tests, the amount of metal dissolved from panels was determined periodically as panels were coated in the composition. The composition dissolved substantially the same amount of metal from various panels coated in the composition when the mv readings were within the range of about 300 to about 400. (The amount of metal dissolved was about 25 to about 30 mg/sq. ft. per minute.) However, as additional panels were processed through the composition, and at an mv reading of about 200, the metal dissolution rate dropped to somewhat below 20 mg/sq. ft. per minute. As additional panels were processed through the composition, the mv reading dropped to about 67 at which value the amount of metal dissolved from the panel was 13.6 mg/sq. ft. per minute. This is exemplary of how the buildup of ferrous iron decreases the rate at which metal is dissolved by the composition.

In another series of tests, metal panels were processed through the composition, and at an mv reading of 47, it was observed that the surface of the composition was loaded with grit-like particles. Such particles were also present on the surface of a coated panel. Additional use of the composition resulted in an mv reading of about 12, at which value the resin dispersion of the composition was broken.

In another series of tests, it was observed that excellent quality coatings of uniform thickness could be produced when the mv reading of the composition was about 300 or above. As the redox potential fell below about 300 mv, the composition began to form thinner coatings. Accordingly, a freshly prepared composition was used to coat panels. As the redox potential of the composition approached 300 mv, there was added to the composition a 30% aqueous solution of hydrogen peroxide in an amount of about 0.004 ml per liter of composition. This raised the redox potential of the composition to about 350. Excellent quality coatings of uniform thickness were obtained as additional panels were coated in the composition.

It should be appreciated from the above description that the present invention has particular applicability to a coating system of the following type. The composition includes or is prepared from a metallic salt, the cation of which is capable of existing in a lower valence form. The composition also includes an acid which, together with said metallic salt, is capable of dissolving metal from a metallic surface immersed in said composition in amounts sufficient to cause the dispersed resin particles in the composition to deposit on the surface in a manner such that a resinous coating which grows with time is formed. In the coating-forming process, the cation of the metallic salt is reduced to its lower valence form. The metallic surface generates metal ions, as it is oxidized by the chemical action of the acid and salt, which metal ions are capable of being oxidized to a higher valence state and to a form which does not affect the coating process adversely. The metal ions are so oxidized by adding to the composition a material capable of oxidizing them.

I claim:

1. In an autodepositing coating method wherein an organic coating is applied to a metallic surface by immersing the surface in an acidic aqueous coating composition containing dispersed particles of an organic coating-forming material and wherein metal ions are dissolved from said surface by the chemical action of said coating composition and build up in concentration as said composition is used to coat additional metallic surfaces, and wherein said composition includes a constituent capable of combining with an oxidized form of said metal ions to form a material which is soluble in the composition, and wherein said coating-forming material becomes unstable in the region of said surface and deposits thereon to form said organic coating, the thickness or amount of which increases during at least a portion of the time said surface is immersed in said composition, and wherein said composition forms on said surface within a predetermined time a coating of predetermined thickness, and wherein additional metallic surfaces are immersed in said composition and are coated as set forth, and wherein during continued use, said composition, the ingredients of which are replenished, as needed, begins to form thinner coatings within said predetermined time on additional of said surfaces or to destablize, and wherein said metal ions are capable of existing in a higher valence state, the improvement comprising adding to the composition a material which oxidizes said metal ions to said higher valence state, said material being added in an amount such that said coating composition forms on said metallic surfaces coatings having said predetermined thickness within said predetermined time, and wherein the oxidized form of said metal ions combines with said constituent to form said soluble material.

2. A method according to claim 1 wherein said surfaces are ferriferous surfaces and wherein said coating-forming material comprises dispersed solid resin particles.

3. In the method wherein an autodeposited coated is formed on a ferriferous surface by immersing the surface in an acidic aqueous coating composition comprising dispersed solid resin particles, ferric fluoride, and HF, wherein said composition forms on said surface within a predetermined time a coating of predetermined thickness, and wherein ferrous iron is formed in said composition by the chemical action of said composition on said surface and wherein said ferrous iron builds up in concentration as said composition is used to coat additional ferriferous surfaces, and wherein as additional ferriferous surfaces are immersed in said composition and the ingredients thereof are replenished, as needed, said composition begins to form thinner coatings within said predetermined time on said surfaces or to destabilize, the improvement comprising adding to said composition a material which oxidizes said ferrous iron to ferric iron, said material being added in an amount such that said coating composition forms on said surfaces coatings having said predetermined thickness within said predetermined time thereby forming in situ ferric iron which is capable of combining with fluoride from the dissociation of HF to form ferric flouride which is soluble in the composition.

4. A method according to claim 3 wherein the concentration of ferrous iron in said composition is monitored by measuring the redox potential of the composition.

5. A method according to claim 3 wherein said oxidizing agent is hydrogen peroxide.

6. In the method wherein an autodeposited resinous coating having a predetermined thickness is formed within a predetermined time on a metallic surface by contacting said surface with an acidic aqueous coating composition comprising solid resin particles dispersed in an aqueous solution of a metallic salt, the cation of which is capable of existing in a lower valence state, and acid, and wherein the chemical action of said composition dissolves metal from said surface to generate metal ions in said composition which build up in concentration during continued use of the composition, the cation of said metallic salt being reduced to its lower valence state as metal is dissolved from said surface, said metal ions capable of existing in a higher valence state and tending to adversely affect the coating capability of said composition, and wherein said composition includes a constituent capable of combining with an oxidized form of said metal ions to form a material which is soluble in the composition, and wherein the ingredients of said composition are replenished, as needed, during continued use of the composition, the improvement comprising adding to said composition a material which oxidizes said metal ions to said higher valence state, said material being added in an amount which is effective to maintain the concentration of said metal ions at a level such that said composition forms within said predetermined time coatings having said predetermined thickness, and wherein the oxidized form of said metal ions combines with said constituent to form said soluble material, thereby maintaining the effectiveness of said coating composition.

7. A method according to claim 6 wherein said constituent is the anion of said acid which forms a soluble complex with said oxidized metal ions.

8. A method according to claim 7 wherein said surface is a ferriferous surface, said cation of said metallic salt is ferric iron and said anion of said acid is fluoride.

9. In the method wherein an autodeposited resinous coating having a predetermined thickness if formed within a predetermined time on a ferriferous surface by immersing the surface in an acidic aqueous coating composition have a pH within the range of about 1.6 to about 4 and comprising:

(A) about 50 to about 100 g/l of dispersed solid resin particles formed by reacting about 40 to about 65 wt. % of butadiene, about 30 to about 65 wt. % styrene, about 3 to about 15 wt. % vinylidene chloride and about 1 to about 4 wt. % methacrylic acid;
(B) ferric fluoride in an amount equivalent to about 0.5 to about 3.5 g/l ferric iron; and
(C) about 0.2 to about 5 g/l of HF;

wherein ferrous iron is formed in said composition by the chemical action of said composition on said surface, said ferrous iron building up in concentration in the composition as additional of said surfaces are immersed in the composition and wherein said composition, the ingredients of which are replenished, as needed, begins to form thinner coatings within said predetermined time during continued use thereof, the improvement comprising adding to said composition a material which oxidizes said ferrous iron to ferric iron, the quantity of said material added being sufficient to maintain the concentration of ferrous iron at a level such that said composition forms on said surfaces coatings having said predetermined thickness within said predetermined time, thereby forming in situ ferric iron which is capable of combining with fluoride from the dissociation of said HF to form ferric fluoride which is soluble in the composition.

10. A method according to claim 9 wherein the concentration of said ferrous iron in said composition is monitored by measuring the redox potential of the composition and wherein said material is added to prevent the redox potential from falling to a value at which undesirably thin coatings are formed.

11. A method according to claim 10 wherein said material is hydrogen peroxide.

12. A method according to claim 10 wherein said resin particles are dispersed in said composition by an anionic emulsifier present in an amount of about 1 to about 4% based on the amount of resin particles and including about 0.2 to about 3 g of furnace black pigment/100 g of resin particles in the form of an aqueous dispersion in which the pigment is dispersed by a nonionic emulsifier.

13. A method according to claim 11 wherein said resin particles are dispersed in said composition by an anionic emulsifier present in an amount of about 1 to about 4% based on the amount of resin particles and including about 0.2 to about 3 g of furnace black pigment/100 g of resin particles in the form of an aqueous dispersion in which the pigment is dispersed by a nonionic emulsifier.

14. A method according to claim 1 wherein said coating-forming material comprises dispersed solid resin particles.

15. A method according to claim 6 wherein said material is hydrogen peroxide.

16. A method according to claim 7 wherein said material is hydrogen peroxide.

17. A method according to claim 8 wherein said material is hydrogen peroxide.

18. A method according to claim 6 wherein the cation of said metallic salt is ferric iron and wherein said metal ions are ferrous iron and wherein said ferrous iron is oxidized to ferric iron.

19. In an autodepositing method wherein an autodeposited coating is formed on a metallic surface by contacting said surface with an acidic aqueous coating composition containing dispersed particles of an organic coating-forming material, said composition having one oxidation/reduction couple and a redox potential at which said composition forms a coating of predetermined thickness within a predetermined time on said surface and wherein metal is dissolved from said surface by the chemical action of said coating composition, said dissolved metal being in a low valence state and soluble in the composition, but capable of being oxidized to a higher valence state, and wherein said composition includes a constituent which is capable of combining with an oxidized form of said metal ions to form a material which is soluble in the composition, and wherein, as additional metallic surfaces are contacted with said composition, the ingredients of the composition are replenished, as needed, and said redox potential tends to fall, and said composition tends to form thinner coatings within said predetermined time, the improvement comprising adding to said composition a material which oxidizes said dissolved metal from said lower valence state to said higher valence state, said metal in said higher valence state combining with said constituent to form said soluble material, and the amount of said oxidizing material added to said composition being sufficient to maintain said redox potential at a value at which said composition forms coatings of said predetermined thickness within said predetermined time.

20. A method according to claim 19 wherein said metallic surfaces are ferriferous surfaces and said autodeposited coatings are formed by immersing said ferriferous surfaces in said composition, and wherein said composition has incorporated therein ferric fluoride and HF and wherein the redox potential at which said coatings of predetermined thickness are formed is equivalent to a reading of about 200 to about 400 mv on a potentiometer having a calomel cell and a platinum electrode.

21. In an autodepositing coating method wherein an organic coating is applied to a metallic surface by contacting the surface with an acidic aqueous coating composition containing dispersed solid particles of an organic coating-forming material and wherein metal ions are dissolved from said surface by the chemical action of said coating composition, said metal ions being capable of existing in a higher valence state, and wherein said composition includes a constituent capable of combining with an oxidized form of said metal ions to form a material which is soluble in the composition, and wherein as additional metallic surfaces are contacted with said composition, the ingredients of the composition are replenished, as needed, and wherein said metal ions tend to build up in concentration and adversely affect the coating capabilities of the composition, the improvement comprising adding to the composition a material which oxidizes said metal ions to said higher valence state, the oxidized form of said metal ions combining with said constituent to form said soluble material, said material being added in an amount such that sufficient of said metal ions are oxidized to said higher valence state to maintain the coating effectiveness of the composition.

22. A method according to claim 21 wherein said coating-forming material comprises dispersed resin particles and wherein said metallic surfaces are immersed in said composition.

23. A method according to claim 22 wherein the concentration of the metallic ions dissolved from said surfaces is monitored by measuring the redox potential of the composition.

24. A method according to claim 22 wherein said composition contains a soluble metallic salt, the cation of which is capable of existing in a lower valence state, said cation being reduced to its lower valence state as metal is dissolved from said surface, and acid, the anion of which is capable of complexing with said oxidized metal ions to form said soluble material.

25. A method according to claim 22 wherein said metallic surfaces are ferriferous surfaces, and wherein said composition includes fluoride and has incorporated therein HF and ferric fluoride, and wherein said metal ions which are dissolved from said surface are ferrous iron, and wherein said material oxidizes said ferrous iron to ferric ion which combines with fluoride thereby forming in situ soluble ferric fluoride.

26. A method according to claim 25 wherein the concentration of said ferrous iron in said composition is monitored by measuring the redox potential of the composition and wherein said material is added to prevent the redox potential from falling to a value at which the coating capabilities of said composition are affected adversely.

27. A method according to claim 25 wherein said material is hydrogen peroxide.

28. A method according to claim 26 wherein said material is hydrogen peroxide.

29. A method according to claim 26 wherein said redox potential is maintained at a value of or equivalent to a reading of about 200 to about 400 mv on a potentiometer having a calomel cell and a platinum electrode.

30. A method according to claim 29 wherein said material is hydrogen peroxide.

* * * * *

UNITED STATES PATENT AND TRADEMARK OFFICE
CERTIFICATE OF CORRECTION

PATENT NO. : 4,186,219

DATED : January 29, 1980

INVENTOR(S) : Wilbur S. Hall

It is certified that error appears in the above-identified patent and that said Letters Patent are hereby corrected as shown below:

On the cover page of the patent, in the lines identified by "[73] Assignee:", for "Union Carbide Corporation, New York, N.Y." read --Amchem Products, Inc., Ambler, Pa.--.

Column 1, line 38, "it is" should read --that is--.

Column 6, line 54, "each move" should read --can have--.

Column 11, line 9, "flou-" should read --fluo- --.

Column 11, line 56 (Claim 9), "if" should read --is--.

Column 14, line 27 (Claim 25), "ion" should read --iron--.

Signed and Sealed this

Twenty-fourth Day of June 1980

[SEAL]

Attest:

SIDNEY A. DIAMOND

Attesting Officer

Commissioner of Patents and Trademarks